UNITED STATES PATENT OFFICE.

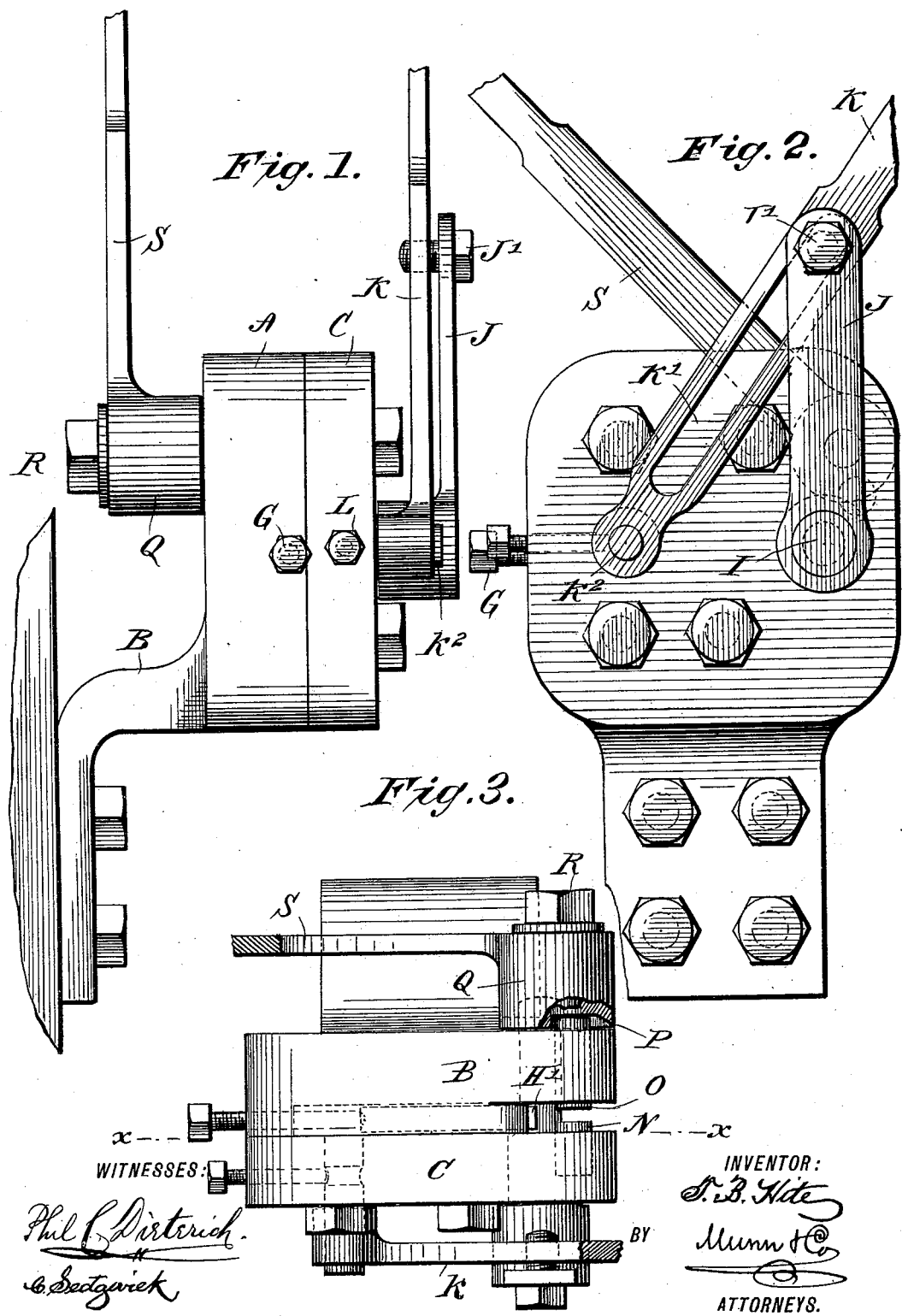

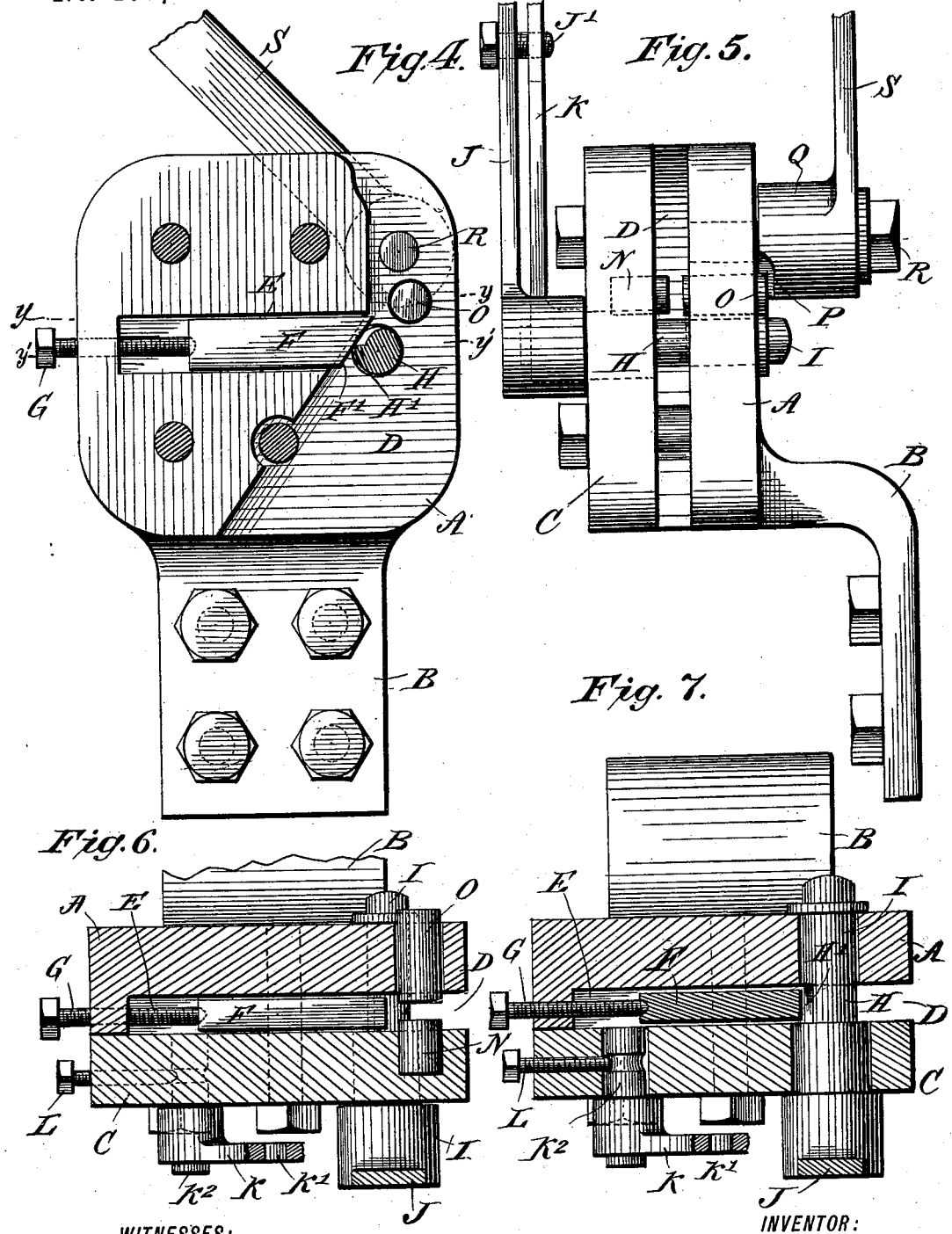

THOMAS B. HITE, OF SEATTLE, WASHINGTON TERRITORY.

SAW-SWAGING MACHINE.

SPECIFICATION forming part of Letters Patent No. 404,623, dated June 4, 1889.

Application filed December 18, 1888. Serial No. 294,009. (No model.)

*To all whom it may concern:*

Be it known that I, THOMAS B. HITE, of Seattle, in the county of King and Territory of Washington, have invented a new and Improved Saw-Swaging Machine, of which the following is a full, clear, and exact description.

The object of the invention is to provide a new and improved saw-swaging machine which is simple and durable in construction and very effective in operation.

The invention consists in certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a rear end elevation of the improvement. Fig. 2 is a side elevation of the same. Fig. 3 is a plan view of the same with parts broken out. Fig. 4 is a sectional side elevation of the same on the line $x\ x$ of Fig. 3. Fig. 5 is a front end elevation of the same. Fig. 6 is a sectional plan view of the same on the line $y\ y$ of Fig. 4, and Fig. 7 is a like view of the same on the line $y'\ y'$ of Fig. 4.

The improved saw-swaging machine is provided with a die-plate A, having at its rear a bracket B, by which the entire device is fastened to a wall or bracket by bolts or other suitable means. In front of the die-plate A is secured a head C, and in the inner front end of the die-plate A is cut a recess D for the entrance of the saw to be swaged. A second recess E leads from the recess D and extends horizontally, being covered up or faced by the head C.

In the recess E is held to slide longitudinally the die F, provided on its front with the bevel end F', and on its rear end bears the screw G, for adjusting the die F in the slot E and in relation to a cam H held in front of the die F in the recess D. The cam H is provided with a shoulder or offset H', and is formed on a shaft I, mounted to turn in the die-plate A and the head C, as is plainly illustrated in Fig. 7. The front end of the shaft I is provided with an upwardly-extending arm J, carrying on its outer end a pin J', engaging a slot K', formed in a lever K, mounted to turn on a pin K², held in the head C, and in horizontal line with the shaft I. The pin K² is held in place by a set-screw L, screwing in the head C.

In the head C is placed a pin N, which projects slightly into the recess D above the cam H. Directly opposite the pin N is placed a similar pin O, mounted to slide transversely in the die-plate A. Against the outer end of the pin O operates a cam P, formed at one end of a hub Q, mounted to turn on a stud R, secured at the rear of the die-plate A. On the hub Q is formed a handle or lever S, for turning the said hub Q on its stud R, so that the cam P moves the pin O inward. The pins O and N serve to clamp the saw-blade to be swaged in place during the operation of swaging.

The operation is as follows: The saw to be swaged is suspended by a rope or other suitable means in such a manner that the teeth of the saw are in front of the die F and the cam H. The die F is set in relation to the cam H by means of the set-screw G, and the levers K and J are placed in an upright position and the pin J' is adjusted in the slot K' of the lever K, so as to place the cam H in position in relation to the die F to stop the point of the tooth of the saw at the desired place between the die F and the cam H. The saw-tooth is then placed between the beveled end F' and the cam H, with the point of the tooth resting against the shoulder H' of the cam H. The saw is then locked or clamped in place by moving the lever S upward, so that the cam P presses the pin O inward, whereby the saw is clamped between the pins N and O. The operator now gives the lever K a quarter-turn, so that the arm J receives one-third of the turn, thereby turning the shaft I and the cam H, which latter now swages the tooth against the beveled end F' of the die F. The swaged tooth can be withdrawn by returning the lever K to its former position and unlocking the pin O by moving the lever S to its former position. A new tooth is then inserted between the die F and the cam H, and the above-described operation is then repeated.

Having thus described my invention, what I claim as new, and desire to secure by Letters Patent, is—

1. In a saw-swaging machine, the combination, with a die-plate having recesses and a head secured on the front of the said die-plate, of a die having a beveled end and held adjustably in one of the said recesses, a cam located at the beveled end of the said die, a shaft mounted to turn in the said die-plate and head and carrying the said cam, an arm secured on the said shaft and provided on its outer end with a pin, and a slotted lever fulcrumed on the said head and connected with the pin of the said arm, substantially as shown and described.

2. In a saw-swaging machine, the combination, with a die-plate and a head secured on the same, of a die held adjustably in the said head and provided with a beveled end, a cam located in front of the said die, a shaft carrying the said cam and mounted to turn in the said die-plate and head, an arm projecting from the said shaft, a pin held on the said arm, a lever fulcrumed on the said head and provided with a slot into which projects the pin on the said arm, a pin held in the said head, a second pin held directly opposite the said first-named pin in the said die-plate, and a second cam for operating the said second-named pin, substantially as shown and described.

3. In a saw-swaging machine, the combination, with a die-plate and a head secured on the same, of a die held adjustably in the said head and provided with a beveled end, a cam located in front of the said die, a shaft carrying the said cam and mounted to turn in the said die-plate and head, an arm projecting from the said shaft, a pin held on the said arm, a lever fulcrumed on the said head and provided with a slot into which projects the pin on the arm, a pin held in the said head, a second pin held directly opposite said first-named pin in the said die-plate, a second cam for operating said second-named pin, and a lever for operating said second cam, substantially as shown and described.

THOMAS B. HITE.

Witnesses:
J. E. Fox,
A. A. Robertson.